United States Patent [19]
Reuter et al.

[11] Patent Number: 6,059,250
[45] Date of Patent: May 9, 2000

[54] TILTING DEVICE

[75] Inventors: Martin Reuter, Dachau; Stefan Richter, Stadtroda, both of Germany

[73] Assignee: Carl-Zeiss-Stiftung, Germany

[21] Appl. No.: 08/933,671

[22] Filed: Sep. 19, 1997

[30] Foreign Application Priority Data

Sep. 19, 1996 [DE] Germany .......................... 196 38 262

[51] Int. Cl.[7] .............................. A47G 1/24; A47G 1/14; G02B 26/08

[52] U.S. Cl. .......................... 248/476; 248/466; 359/224; 359/198

[58] Field of Search ..................................... 248/466, 476, 248/288.11; 359/196, 198, 200, 223, 224, 225, 298, 872; 384/2–6, 446

[56] References Cited

U.S. PATENT DOCUMENTS

| | | |
|---|---|---|
| 4,383,763 | 5/1983 | Hutchings et al. . |
| 4,660,941 | 4/1987 | Hattori et al. . |
| 4,691,212 | 9/1987 | Solcz et al. . |
| 4,708,420 | 11/1987 | Liddiard . |
| 5,159,225 | 10/1992 | Um . |
| 5,170,277 | 12/1992 | Bard et al. . |

FOREIGN PATENT DOCUMENTS

| | | | |
|---|---|---|---|
| 0 726 479 A2 | 8/1996 | European Pat. Off. | ........ G02B 7/182 |
| 44 05 501 C1 | 6/1995 | Germany | .......................... H02N 2/00 |
| 195 19 161 A1 | 11/1995 | Germany . | |
| PCT/DK89/ 00190 | 10/1989 | WIPO | .............................. G02B 7/18 |

OTHER PUBLICATIONS

Translation of German Patent No. 19, 519,161 A1, Nov. 1998.

Primary Examiner—Derek J. Berger
Assistant Examiner—Michael Nornberg

[57] ABSTRACT

The invention relates to a tilting device that makes it possible to tilt around at least one axis, with a tilting member, a base member, and an elongated holding device arranged beneath the tilting member. At least two stabilizing members, of rectangular shape, are installed, offset from each other, on the base member. Connecting members between the holding device and the stabilizing members engage the holding device at different heights. During movement of at least one stabilizing member, at least another stabilizing member remains rigidly fixed at one location.

15 Claims, 1 Drawing Sheet

TILTING DEVICE

BACKGROUND OF THE INVENTION

1. Field of the Invention

This invention relates to a tilting device and, more particularly, to a tilting device that makes it possible to tilt around at least one axis.

2. Description of Relevant Art

Such tilting arrangements are well known in the art. They serve to deflect a light beam incident on them through a given angle. There is a differentiation, in particular, between 1-axis and 2-axis tilting mirrors.

While single-axis tilting mirrors are today commercially available with great technical variety, two-axis tilting mirrors, which are today indeed state of the art and on the market, are subject to important technical limitations.

A tilting mirror arrangement used for scanning is known from U.S. Pat. No. 4,708,420. In it, the scanning mirror is connected via flexible joints to piezoceramic drive elements arranged parallel to the mirror surface. This arrangement has to be very large so that the piezoceramic drive elements can tilt the mirror through a large angle. This results from the small deflection of the piezoceramic drive elements, which is proportional to the length of these elements. This arrangement is thus not suited to tilt small mirrors through a large angular range, when the drive mechanism behind the tilting mirror is to be limited to the dimensions of the mirror surface.

In a tilting mirror arrangement known from U.S. Pat. No. 4,383,763, the mirror is mounted at one point and is moved by piezoelectric ceramics. Here also, the dimensions of the mirror have to be very large if the tilting mirror is to be tilted through at least 1°.

A tilting mirror mounting is known from U.S. Pat. No. 4,660,941, in which the movement of the tilting mirror is effected by piezoelectric elements that act on the mirror via levers. This arrangement is also not suitable for tilting a small mirror through at least 1°.

A piezoelectric beam reflector is known from U.S. Pat. No. 5,170,277, in which the mirror member is directly attached to the piezoelectric element. This has the disadvantage that the mirror has no defined pivot point when pivoting.

A piezoelectric beam reflector is known from U.S. Pat. No. 4,691,212, and is used in a scanning arrangement. The disadvantage of this arrangement is that a given deflection angle cannot be rigidly maintained when the pivot point is to remain stationary.

A piezoelectric scanning device is known from German Patent DE 195 19 161, in which a pair of piezoelectric plate elements, which extend transversely of a base, act in common on a constructional element at one end such that this constructional element tilts. Thus, for one tilt axis, two plate elements that move together are necessary, and have to move oppositely for tilting. The plate elements engage for this purpose at different places on a bar beneath the constructional element. Two additional plate elements are required for tilting around a tilt axis perpendicular to this.

SUMMARY OF THE INVENTION

The object of the present invention is to provide a tilting device in which a constructional element can be tilted with high precision through angles of up to 5°.

This object is attained according to the invention by a tilting member, a base member, and an elongated holding device arranged beneath the tilting member. At least two stabilizing members of rectangular shape are on the base member and are off-set from each other. Connecting members are arranged between the holding device and the stabilizing members and engage the holding device at different heights. During motion of at least one of the stabilizing members, at least one other of the stabilizing members remains rigidly fixed at one location to define a tilting axis.

The tilting device according to the invention, which makes it possible to tilt around at least one axis, has at least one tilting member and at least one base member, and at least one elongated holding device arranged beneath the tilting member. At least two stabilizing members, of rectangular shape, are installed on the base member and, offset from each other, engage the holding device of the tilting member. Connecting members are arranged between the holding device and the stabilizing members, and engage the holding device at different heights.

An important concept relating to this tilting device is that during the motion around a tilt axis by position or shape changing of one of the at least two stabilizing members, the other stabilizing member remains rigidly at one location. The one stabilizing member performs a change of position or of shape and, by means of the connecting members installed on it, provides for a tilting motion of the tilting member relative to the base member, while the other stabilizing member remains rigidly at its position and thus provides a defined rotational or tilt axis for the tilting device.

The two stabilizing members can then be directly opposite each other and can be situated in a common axis with the holding device, engaging, however, at different heights on the holding device (e.g., single-axis tilting mirrors). They can however be situated at another angle to each other. Increased stability is attained by the use of stabilizing members which are opposite each other.

The tilting motion in the tilting device thus takes place only at one component (stabilizing member), which permits the design of the whole tilting device to be very simple and also favorable as regards costs.

When the component which participates in the tilting motion is, e.g., a bending actuator, the tilting device may be constructed from a very small number of components such that the tilting motion can be initiated at the bending actuator from the exterior.

The bending actuator can operate, according to the intended use, by a hydraulic, pneumatic or electrical principle, this enumeration being solely as an example. However, advantageously, the bending actuator is a piezoceramic bending actuator, which is driven via an electrical lead and which bends to one side or the other according to the electrical state on this lead. If no voltage, or a constant voltage is present on it, i.e., no current flows through the lead, the bending actuator is rigid enough to serve as a stabilizing member, or for the other stabilizing member to produce the rotation axis for the tilting member. That is, such a stabilizing member has bending elasticity in a horizontal axis, and is stiff perpendicular thereto, in the other horizontal axis.

The connecting member between the stabilizing member and the holding device of the tilting member is, on the contrary, advantageously stiff in the axis of motion and has bending elasticity perpendicular thereto. It can thereby transmit the motion of the stabilizing member to the holding device, without setting too great resistance to a tilting motion in the direction perpendicular thereto. In particular, connecting members that are plate-shaped and have a narrowed place between the holding device and the stabilizing members have this property. This arrangement leads to a connecting member that comprises a play-free cardan joint, and in particular, a solid-body joint.

Preferably, if the two (advantageously) rectangular stabilizing members are arranged at an angle of about 90° to each other, then by the transmission of force or the motion of the one stabilizing member through the intermediation of the connecting member, to the holding device of the tilting member, the holding device can be tilted such that the tilting motion takes place in the stiffest axis of the other stabilizing member.

If two additional rectangular stabilizing members are arranged at an angle of approximately 90° to each other, so that the stabilizing members respectively have an angle of approximately 90°, a tilting device is obtained which can be tilted around two axes.

It is then advantageous if the opposed stabilizing members are coupled together, as regards motion, by the connecting members. This considerably increases the stiffness of the tilting arrangement and thus provides more reliable operation of the tilting device.

As previously mentioned, it is advantageous if the stabilizing members are constructed as bending actuators. The number of components required to build the tilting device is thus minimized. In particular, the use of piezo-actuators as stabilizing members is advantageous here.

Many bending actuators and in part also other stabilizing members change position during the course of time, even without external influences. Thus, the use of a position measuring system for each tilt axis is very advantageous.

In particular, for the embodiment of the smallest possible tilting devices, such a position measuring system advantageously consists of an inductive measuring system, which can consist in a very simple manner of a coil with or without an iron core, if the tilting member has magnetic properties, at least in the measuring region of the position measuring system.

The tilting device according to the invention is suitable for all applications in which at least a single-axis motion is concerned, over a relatively small tilt angle (<10°, preferably<5°), at relatively high tilting frequencies. The applications include scanning, exposures, material erosion, and the like.

The embodiment of the connecting members is in particular very advantageous which, with excellent stiffness for force transmission in one axis, have an outstanding elasticity, due to the plate thickness and the lateral removal of material, perpendicular to the axis with the high stiffness. These connecting members with solid-body joints thereby permit very rapid single-axis motions, without preventing motions in the axis situated perpendicularly thereto. They can be produced easily and inexpensively, in that they are simply stamped out of a plate or foil.

In particular, large segment arrays can be constructed with the tilting device according to the invention, and consist of a surface arrangement of many of the tilting devices according to the invention, since the drive mechanism is arranged completely beneath the surface to be tilted.

Both passive components (e.g., mirror surfaces and the like) and also active components (e.g., laser diodes) can then be arranged on the surface that is to tilt.

BRIEF DESCRIPTION OF THE DRAWINGS

The invention will now be described, taken together with the drawings, in which.

DETAILED DESCRIPTION OF THE PREFERRED EMBODIMENTS

Figure 2:
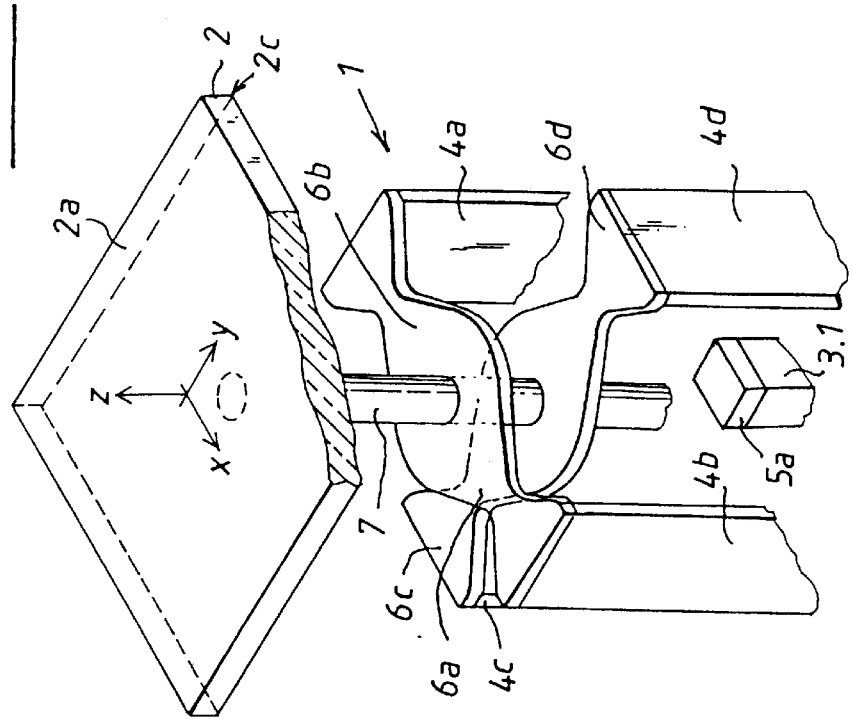
FIG. 2 is an perspective view of the tilting device of FIG. 1.
Figure 1:
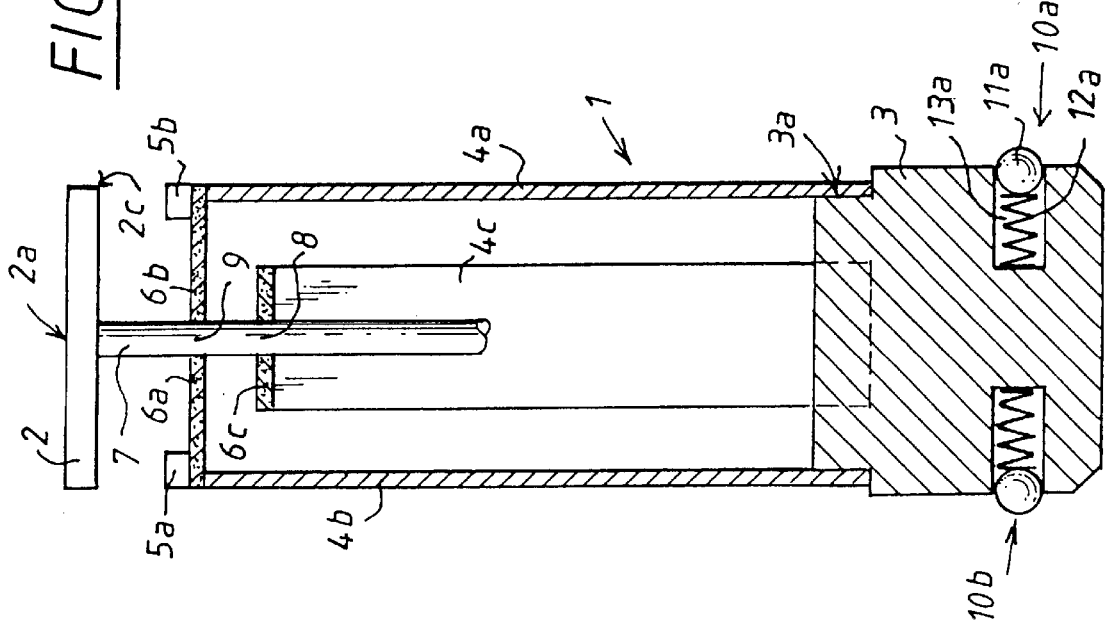
FIG. 1 is a sectional view through the tilting device according to the invention.

The tilting device (1) shown in FIGS. 1 and 2 consists of a base member (3) and a tilting member (2), the latter being mirror-coated on its upper side (2a), so that, in this referred embodiment, the device (1) shown in the Figures is a tilting mirror device (1) that can be tilted around two axes. FIG. 1 shows a section through the tilting mirror device (1) that passes exactly through one of the two tilt axes.

Recesses are located at the upper portion of the base member (3) and have a depth greater than the stabilizing members (4a, 4b, 4c, 4d) attached (e.g., adhered) to their inner side (3a). The depth of these recesses is at least larger than the deformability of the stabilizing members (4a, 4b, 4c, 4d) in the predetermined angular region, so that the stabilizing members (4a, 4b, 4c, 4d), and also the tilting member (2) itself, never project over the outer edge of the base member (3).

Two connecting members (6a, 6b, 6c, 6d) are attached (e.g., adhered) to the ends of the stabilizing members (4a, 4b, 4c, 4d) and respectively connect together two of the stabilizing members (4a, 4b, 4c, 4d).

Latch devices (10a, 10b) are located in the lower region of the base member (3) for insertion into corresponding detents of a carrier member (not shown in the drawing). This carrier member can for example serve to receive several of the tilting devices (1) and to securely place them in defined positions relative to each other.

The latch devices (10a, 10b), in the tilting device (1) essentially consist of a ball (11a) in a recess (13a) of the base member (3) that is pressed outward by a spring (12a). The recess (13a) has a taper in its outer edge, so that the spring (12a) cannot push the ball (11a) out of the recess (13a). However, the recess (13a) has an internal diameter that permits the ball (11a) to penetrate completely into the recess (13a).

The latch device (10a, 10b) is used to secure an electrical contact for each of the stabilizing members (4a, 4b, 4c, 4d) to a respective control device for piezo-actuators. Further latch devices (not shown in the drawing) secure the connection of the sensors (5a, 5b) to a computer system, which can act as an adjuster and controller for the drive devices of the piezo-actuators (4a, 4b, 4c, 4d).

The two-axis tilting drive of the mirror on the tilting member (2) as shown makes possible the construction of a mirror size of greater than 3×3 mm at a tilt angle of more than 2° in each direction, with an angular resolution of the order of magnitude of plus or minus one second of arc.

The tilting device (1) is distinguished by a uniform angular resolution for both tilt axes and has a setting time of about ¹/₁₀ second because of the use of piezoelectric bending actuators as the stabilizing members (4a, 4b, 4c, 4d).

At tilt angles of 2°, a height stroke of 175 $\mu$m is obtained, for example, at the mirror edge (2c). An angular resolution of one second of arc corresponds to about 24 nm at a constructional size of the mirror surface (2a) of 10×10 mm.

These values are very small and set high requirements for the play-free nature of the stabilizing members (4a, 4b, 4c; 4d), not visible in the Figure and therefore not represented, for the stability of control of the arrangement which effects the tilting motion (here, piezoelectric bending actuators) and for the resolution of a position measuring system (5a, 5b) when an actual value is sensed.

The tilting device (1) shown, with a mirror, has the exceptional advantage that its production can take place at absolutely minimal cost, and that the lateral space requirement is not greater than the mirror surface (2a).

Piezo-actuators are used as the stabilizing members (4a, 4b, 4c, 4d) and at the same time as positioning elements in the tilting device.

The position change of the stabilizing members (4a, 4b, 4c, 4d) is sensed and controlled by a highly sensitive, inductively operating position measuring system (5a, 5b).

The tilting device (1) is controlled by means of a computer system, to which it is connected by various cables. An electrical cable leads to each piezo-actuator (4a, 4b, 4c, 4d), to cause the piezo-actuators (4a, 4b, 4c, 4d) to effect a position change when required.

Furthermore a respective signal cable leads from each position measuring system (5a, 5b) to the computer system, which is equipped with a measurement value sensing device for inductive measuring systems.

The data calculated from the measurement values of the individual position measuring systems (5a, 5b) are compared with the reference values that were calculated according to a formula or are laid down in a table and make it possible to determine the position of the tilting member (2). If the measurement indicates that the tilting member (2) is not, or is no longer, in the desired position, the computer system produces a signal for the control device of the respective piezo-actuator (4a, 4b, 4c, 4d), which then corrects the control of the respective piezo-actuator (4a, 4b, 4c, 4d) such that the tilting member (2) is moved into the desired position.

Since the masses to be moved are small in the tilting device (1) according to the invention as shown in FIG. 1, piezo-ceramic bending actuators (4a, 4b, 4c, 4d) are outstandingly suitable for this task. The disadvantage of the relatively low stiffness or stability of the bending actuators (4a, 4b, 4c, 4d) in the bending direction has no effect as an essential limitation in the structure which has been described. On the contrary, the tilting device (1) shown in FIG. 1 is distinguished by an unexpectedly high stability.

Good bending actuators (4a, 4b, 4c, 4d) provide the required stroke of 175 $\mu$m, given above as an example, at constructional lengths of about 20 mm.

Because of space limitations, the stabilizing members (4a, 4b, 4c, 4d) that act as bending members do not act directly in the vertical direction, but are placed beneath the tilting member (2) provided with the mirror, and work with a horizontal direction of action.

A pair of two parallel-working bending elements (4a, 4b, 4c, 4d) is arranged in each direction of motion. Their deflecting ends are connected together by a specially shaped spring sheet, which serves as a connecting member (6a, 6b; 6c, 6d) particularly between the stabilizing members (4a, 4b, 4c, 4d) and the rod-shaped holding device (7) that is installed beneath the tilting member (2), so that a parallel guidance results. The material of a connecting member (6a, 6b; 6c, 6d) can consist of a great variety of materials (e.g., spring steel, hard or soft plastic, and the like).

The horizontal translational motion introduced by the bending members (4a, 4b, 4c, 4d) requires, in providing the tilting motion of the tilting member (2) relative to the base member (3), a certain lever length between the working plane of the translational motion and the tilting axis which is fixed with respect to translation.

In considering the tilting device (1) in the Figures, it is to be noted that the stabilizing members (4a, 4b, 4c, 4d) have a double task in the illustrated device. On the one hand, they provide for the motion of the tilting member (2) and thus are drive elements. On the other hand, they act as holding members for the motion of the tilting member (2) in the other tilting axis, and are then fixing, mounting, or position stabilizing elements.

If the plane of the drawing in FIG. 1 is defined as the x-z plane, and if the x-axis is situated parallel to the illustrated position of the connecting members (6a, 6b), the y-axis then projects perpendicularly from the plane of the drawing.

In order move the tilting member (2) in the direction of the x-axis, the piezo-ceramic bending actuator (4b) is moved toward the holding device (7), and the piezo-ceramic actuator (4a) is moved away from the holding device (7), or vice versa. The two piezo-ceramic bending actuators (4a, 4b) are equal in length, and engage at the same height with the connecting members (6a, 6b), which connect them both to the holding device (7).

The pivot point (8) is situated, in this tilting motion, beneath the connecting members (6a, 6b), in the interior of the holding device (7) at the height of the connecting members (6c, 6d) which connect together the two other piezoceramic bending actuators (4c, 4d). The two piezo-ceramic bending actuators (4a, 4b) act here as drive elements, while the two piezo-ceramic bending actuators (4c, 4d) establish the pivot point (8) by means of their connecting members (6c, 6d).

In order move the tilting member (2) in the direction of the y-axis, the piezo-ceramic bending actuator (4c) is moved toward the holding device (7), and the piezo-ceramic bending actuator (4d) is moved away from the holding device (7), or vice versa. The two piezo-ceramic bending actuators (4c, 4d) are of equal length and engage at the same height with the connecting members (6c, 6d) which connect them both to the holding device (7).

In this tilting motion, the pivot point (9) is situated above the connecting members (6c, 6d), in the interior of the holding device (7) at the height of the connecting members (6a, 6d), which connect together the two other piezo-ceramic bending actuators (4a, 4b). The two piezo-ceramic bending actuators (4c, 4d) act here as drive elements, while the two piezo-ceramic bending actuators (4a, 4b) establish the pivot point (9) by means of their connecting members (6a, 6b).

The holding device (7) (or the lever element, for two degrees of freedom) can however also be shaped in another fashion than shown in this embodiment and, for example, can be embodied as a cylindrical foot, which ends downward in a point, beneath the tilting member (2) used as the mirror carrier.

The planes in which the two mutually orthogonally acting translation motions of the bending ends of the bending elements (4a, 4b, 4c, 4d) act cannot be identical in the tilting device (1) according to the invention, since the bending elements (4a, 4b, 4c, 4d) are movable only in one axial direction and hence only connections with play (i.e., sliding) would be a possibility between the bending elements (4a, 4b, 4c, 4d) and the connecting sheet or connecting member (6a, 6b, 6c, 6d).

Therefore two separate, perpendicular working planes (actions or operation planes)are present. The pivot point (8, 9) of each of the two degrees of freedom is situated in the working plane of the respective other degree of freedom. The direction of the mirror normals is given by the straight line connecting between the points at which the mirror foot axes pass through the two connecting members (6a, 6b; 6c, 6d).

When there is a lateral translatory displacement of the connecting members (6a, 6b; 6c, 6d) in one of the working planes, the holding device (7) of the tilting member (2) which serves as a mirror carrier is laterally deflected, and is thus tilted around the pivot point (8, 9) in the respective other orthogonal working plane.

Therefore a pivot point (8, 9) must likewise be present in the exactly active plane; this leads to a cardan jointed construction of the connecting member (6a, 6b; 6c, 6d), with nearly complete decoupling of the two tilting motions.

Since the two pivot points (8, 9) do not coincide with the mirror surface (2a), each tilting motion effects a very small lateral displacement of the mirror surface (2a). This is tolerable since it only amounts to 0.1 mm or less (if the tilting member (2) has a mirrored surface of 10 mm ×10 mm size, and the tilting member (2) is tilted through 2° in one direction).

A cardan-type mounting is thus present in each working plane. The cardan-type mounting takes place by means of the two connecting members (6a, 6b; 6c, 6d), which represent cardan joints and are embodied as solid joints. They (6a, 6b; 6c, 6d) are embodied play-free and consist of a resilient material (i.e., spring steel). Considering the small motions of the tilting member (2), only small restoring forces occur on the twisting webs of the connecting members (6a, 6b; 6c, 6d).

At least one inductive position measuring system (5a, 5b) is present in the tilting device, for sensing the translational motions which effect the tilting in one of the two tilting axes.

Each of the two position measuring systems (5a, 5b) consists of a pair with two measuring coils for determining the position of the tilting member in one tilt axis. The signals of the position measuring system (5a, 5b) are passed via a cable to a computer system, which obtains the position information from the signal difference. Drift effects are thereby avoided, which could otherwise falsify the measurement result. The tilting device (1) is constructed such that both degrees of freedom are decoupled, so that the tilting around each axis can be determined and corrected independently of the tilting around the other axis.

The tilting device (1) has a stable construction with small tolerances, due to the use of respective parallel acting stabilizing members (4a, 4b, 4c, 4d) for each tilt axis.

The pairwise use of two respective parallel acting stabilizing members (4a, 4b, 4c, 4d) leads to a very high mechanical stability, a doubled stiffness, and an elevation of the dynamics in comparison with a drive with respectively only one piezo bending element (4a, 4b, 4c, 4d).

The very compact two-axis tilting device (1) for an optical deflecting mirror (2a) is particularly distinguished in that the drive of each tilting degree of freedom is effected by means of a mechanically coupled pair of piezo-ceramic bending actuators (4a, 4b, 4c, 4d). The mounting of the tilting device takes place beneath the tilting member (2) on the holding device (7) in two planes, where each of the two mountings consists of a connecting member (6a, 6b; 6c, 6d) acting as a play-free cardan joint.

Furthermore, a translation is executed in each of the two orthogonally arranged cardan suspensions, and is converted into a tilting motion around a rotation axis situated in the respective other plane. A thorough decoupling of the orthogonal tilting motions is thereby attained.

The two mutually independently acting, highly sensitive, inductive position measuring systems (5a, 5b) for each of the two tilt axes sense the magnitude of the translation which effects the tilting motion by forming the difference of two opposed signals. Drift effects on the absolute values of the individual signals are thereby eliminated.

The tilting device according to the invention is also distinguished in that:

the limiting tilt angle around the x-axis or y-axis has an angle up to plus/minus 5 →10°;

the constructional size is scarcely limited (In the tilting devices according to the state of the art, given tilt angles require a given minimum constructional size, or even a maximum constructional size, which is respectively troublesome.);

the constructional size of the tilting mirror arrangement is equal to, or even smaller than, the mirror surface, which is particularly important behind the mirror surface in small tilting mirrors (i.e., with the mirrors according to the known state of the art, no high packing densities can be attained); and uncomplicated production technique is achieved, in contrast to the known two-axis tilting mirrors.

As can be seen from FIG. 1 and particularly from FIG. 2, the piezo actuators (4a, 4b, 4c, 4d) have a rectangular cross section. They bend very easily in one axis, which is their tilt axis, while they are very stable in the axis situated perpendicular to this. The piezo-actuators (4a, 4b, 4c, 4d) have a lateral size which is substantially smaller than the lateral size of the base member (3). Thus there is a free space laterally of them, in which there is located, in each corner region, a respective vertical extension (3.1) of the base member (3) (only one extension is shown in FIG. 2, for the sake of clarity), with enough free space so that the motion of the piezo-actuators (4a, 4b, 4c, 4d) themselves is not hindered. The position measuring systems (5a, 5b) are attached to these vertical extensions (3.1) of the base member (3).

The position measuring systems (5a, 5b) operate inductively, and extend as closely as possible to the underside of the tilting member (2), which is made electrically conducting. The distance between the position measuring systems (5a, 5b) and the underside of the tilting member (2) is set such that the tilting member (2) can assume its maximum tilt angle in each of the two tilt axes and even both at once, without interference.

The holding device (7) is embodied as a cylindrical rod, and is located centrally beneath the center of gravity of the tilting member (2).

The plate-shaped connecting members (6a, 6b; 6c, 6d) are embodied as thin plates which have high stiffness in the thrust or pressure direction. Since, however, the connecting members (6a, 6b; 6c, 6d) also have to twist on themselves on the production of the pivot points (8, 9) when there is a motion of the respective other connecting member (6a, 6b; 6c, 6d), they have on both sides a tapering of the material between the holding device (7) of the tilting member (2) and the ends of the piezo-actuators (4a, 4b, 4c, 4d) which are firmly connected to them (that is, they are notched there, as is clearly shown in FIG. 2), so that they act as a solid-body joint. It is important that the thickness of the connecting members (6a, 6b; 6c, 6d) is, on the one hand, not too large, in order to insure the torsional joint properties of the connecting members (6a, 6b; 6c, 6d), and that for the same reason the lateral taperings of material are sufficiently large.

On the other hand, both sizes must not be under-dimensioned, so as not to hinder the force transmission between the piezo-actuators (4a, 4b, 4c, 4d) and the holding device (7).

We claim:

1. A tilting device providing a tilt of a tilting member around a first and a second tilt axis, comprising:

a tilting member, a base member, an elongated holding device arranged at said tilting member and defining a longitudinal axis, a first and a second stabilizing member arranged on said base member, a first connecting member arranged at said first stabilizing member and engaging said holding device in a first position along said longitudinal axis, a second connecting member arranged at said second stabilizing member and engaging said holding device in a second position along said longitudinal axis different from said first position, wherein said first connecting member is stiff in a first direction perpendicular to said longitudinal axis and bends elastically in a second direction perpendicular to said first direction and said longitudinal axis, wherein said second connecting member is stiff in said second direction and bends elastically in said first direction, wherein said first connecting member defines a tilt axis having a fixed direction in said second direction when said second stabilizing member is moved for tilting said tilting member, and wherein said second connecting member defines a second tilt axis having a fixed direction in said first direction when said first stabilizing member is moved for tilting said tilting member.

2. The tilting device (1) according to claim 1, wherein said connecting members (6a, 6b, 6c, 6d) are plate shaped and have narrowed portions between said holding device (7) and said stabilizing members (4a, 4b, 4c, 4d) to provide a play-free cardan joint.

3. The tilting device (1) according to claim 2, wherein said cardan joint comprises a solid body joint.

4. The tilting device (1) according to claim 1, wherein at least two of said stabilizing members (4a, 4b, 4c, 4d) are arranged at an angle of approximately 90 degrees to each other.

5. The tilting device (1) according to claim 1, wherein at least two additional of said stabilizing members (4a, 4b, 4c, 4d) are arranged at an angle of 90 approximately degrees to each other so that all of the stabilizing members (4a, 4b, 4c, 4d) are arranged at an angle of 90 degrees with respect to each other.

6. The tilting device (1) according to claim 5, wherein opposed stabilizing members (4a, 4b, 4c, 4d) are movably coupled by said connecting members and attached to said holding device (7) at a same height by means of said connecting members (6a, 6b, 6c, 6d).

7. The tilting device (1) according to claim 1, wherein said stabilizing members (4a, 4b, 4c, 4d) comprise bending actuators.

8. The tilting device (1) according to claim 1, wherein said stabilizing members (4a, 4b, 4c, 4d) comprise piezo-actuators.

9. The tilting device (1) according to claim 1, further comprising at least one vertical web (3.1) arranged on said base member (3) below said tilting member (2) and a position-measuring system (5a) arranged on said web (3.1) for at least one tilt axis.

10. The tilting device (1) according to claim 9, wherein said position-measuring system (5a) comprises an inductively operating position-measuring system (5a).

11. A tilting device that makes it possible to tilt around at least one axis, comprising:

a tilting member (2), a base member (3), an elongated holding device (7) arranged beneath said tilting member (2), at least two stabilizing members of rectangular shape (4a, 4b, 4c, 4d) on said base member (3) that are off-set from each other, and connecting members (6a, 6b, 6c, 6d) arranged between said holding device (7) and said stabilizing members (4a, 4b, 4c, 4d) and engaging said holding device (7) at different heights, wherein during motion of at least one of said stabilizing members (4a, 4b, 4c, 4d) at least one other of said stabilizing members (4a, 4b, 4c, 4d) remains rigidly fixed at one location to define a tilting axis, wherein at least two additional of said stabilizing members (4a, 4b, 4c, 4d) are arranged at an angle of approximately 90 degrees to each other so that all of said stabilizing members (4a, 4b, 4c, 4d) are arranged at an angle of approximately 90 degrees with respect to each other, and wherein opposed stabilizing members (4a, 4b, 4c, 4d) are movably coupled by said connecting members and attached to said holding device (7) at a same height by said connecting members (6a, 6b, 6c, 6d).

12. The tilting device according to claim 11, wherein said stabilizing members (4a, 4b, 4c, 4d) comprise bending actuators.

13. The tilting device according to claim 11, wherein said stabilizing members (4a, 4b, 4c, 4d) comprise piezo-actuators.

14. The tilting device according to claim 11, further comprising at least one vertical web (3.1) arranged on said base member (3) below said tilting member (2) and a position-measuring system (5a) arranged on said web (3:1) for at least one tilt axis.

15. The tilting device according to claim 14, wherein said position-measuring system (5a) comprises an inductively operating position-measuring system (5a).

* * * * *